Feb. 5, 1963
C. J. KREMER, JR
3,076,659
LIQUID WIPER PACKINGS FOR RECIPROCATING RODS
Filed June 9, 1960
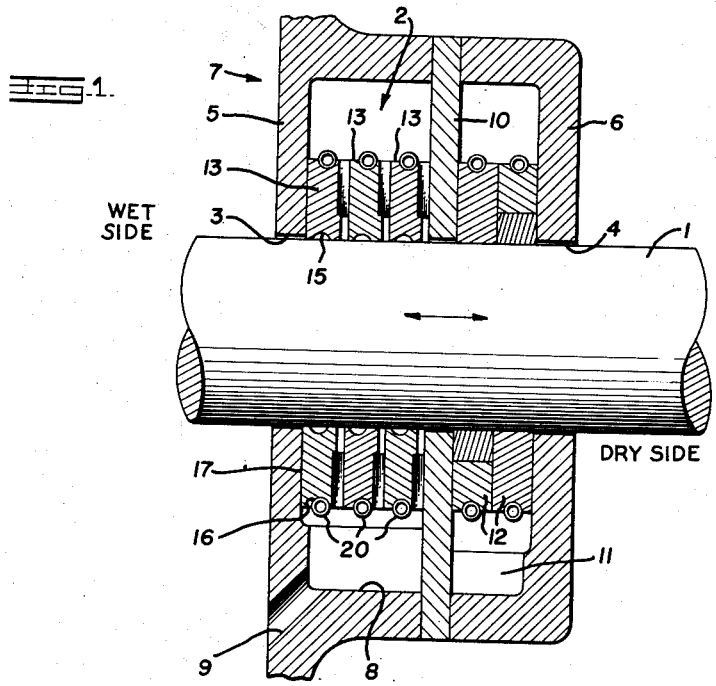
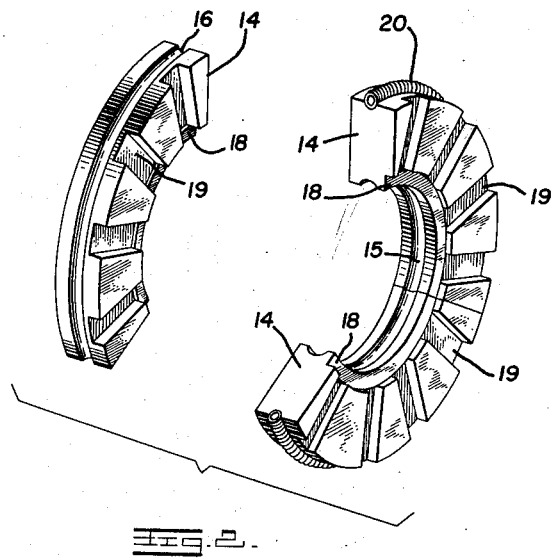
INVENTOR
CHARLES J. KREMER, JR.
BY
ATTORNEY

United States Patent Office 3,076,659
Patented Feb. 5, 1963

3,076,659
LIQUID WIPER PACKINGS FOR
RECIPROCATING RODS
Charles J. Kremer, Jr., Louisville, Ky., assignor to Dover
Corporation, Washington, D.C., a corporation of Delaware
Filed June 9, 1960, Ser. No. 34,957
4 Claims. (Cl. 277—192)

The present invention relates to oil wiper packings for reciprocating rods, such as a connecting rod for transmitting power from an engine, motor or other prime mover to a compressor or other driven mechanism.

The primary object is to improve the oil-sealing function of the packing so as to reduce and possibly prevent the undesired movement of lubricating oil from the wet side of the machine to the dry side thereof.

Another object is to provide packings of the class indicated in the form of rings, or assemblies of a plurality of identical or similar rings, engaged about a reciprocable rod and contained within a housing enclosing a portion of the shaft, which are of simple and easily produced construction, which can be readily installed, removed and replaced, and which will function with heretofore unattained efficiency in "scraping" lubricating oil from the rod during its axial movement and in eliminating the valving or pumping action of the best prior art packing means.

A related and more specific object is to provide ring means for the foregoing purpose having a novel arrangement of oil-conducting slots particularly related to the surfaces of the rings themselves and of the housing or other confining walls with which the rings cooperate so as to overcome the tendency of previous rings of this type to transmit oil, set in motion by splash lubrication or otherwise, along the rod from the oil source or wet side to portions of the rod intended to be kept dry.

The invention has particular applicability to installation on the connecting rod of a power-driven compressor, coupling an engine to the compressor and having one end portion extending into the engine crankcase and projecting therefrom through an oil-sealing chamber. In such an installation, in which the embodiment selected in this application for letters patent to exemplify the principles of the invention will be described, the ring or ring assembly provided by the invention is enclosed within the chamber in snug surrounding engagement with the portion of the rod that is contained within the housing forming the chamber. This arrangement is shown in the accompanying drawing forming part of this application, in which FIGURE 1 is an axial section through a ring assembly and housing, shown mounted in operative position on a rod, and FIGURE 2 is a perspective view of one of the rings, with one of the segments thereof shown separated and detached for clarity of illustration.

In these figures the reference numeral 1 designates a connecting rod arranged for reciprocation axially as indicated by the double headed arrow between such instrumentalities as the engine and compressor hereinabove mentioned. It may be assumed that the engine and its crankcase, which are not shown, are located at the left, beyond the figure, and that a portion of the rod beyond its broken off end at the righthand side of the figure is connected to the driven mechanism. The lefthand side or end of the rod is thus the wet side, being lubricated by oil, typically in a splash system, and the righthand side or end is the dry side. The function of the packing is principally to prevent escape or leakage of oil from the wet to the dry side.

According to the present invention and particularly the presently selected illustrative embodiment thereof, this is accomplished by the ring assembly designated generally 2 which is mounted on the portion of the rod which reciprocates axially through openings 3 and 4 in the end walls 5 and 6, respectively, of a housing 7 which is mounted on or otherwise juxtaposed to the engine crankcase.

This housing, which may conveniently be made of generally cylindrical shape, is of a diameter somewhat greater than that of the rings, so that the lower zone of the interior chamber forms a sump into which any oil in the housing may be free to fall by gravity. If, as is generally the case, and as is shown in the drawing, the rod extends through the housing in a horizontal direction, the sump will be in that portion of the chamber designated 8. An oil discharge port 9 is provided at the lowest part of this sump to return oil to the crankcase or other oil reservoir on the wet side of the rod.

In the illustrated embodiment of the invention the housing contains a partition or division wall 10 separating the zone of the sump 8 from a compartment 11 on the dry side of the rod which contains a seal ring, or a pair of seal rings, 12. These form no part of the present invention, which is concerned exclusively with the wiper packing rings forming the assembly 2, which will now be described.

The rings of the assembly 2, here shown as three in number, are all identical, each being formed as best shown in perspective in FIG. 2. Each ring, designated 13, comprises a pair or more of arcuate segments 14 which when assembled compose a full-circular assembly. In the drawing each segment comprises 120° of arc and three such segments make up each ring. The segments are identical. Each has an inner periphery adapted snugly to embrace the rod and containing an inner peripheral groove 15 and an outer periphery containing an outer peripheral groove 16. The radial side surface 17 of each segment which, when the assembly is complete and mounted in operative position, faces the wet side of the rod, is flat, and the opposite radial side surface is formed with a relatively shallow inner peripheral groove 18 and with a plurality of substantially radial slots 19 which are deeper than the groove and each of which extends from the groove through to the outer periphery of the segment.

The segments 14 are assembled end to end around the rod 1 to make up the rings 13, and the rings are mounted in axially adjacent position within the housing 7 in the manner shown in FIG. 1 where, it will be noted, the surface of each ring that is configured with the slots 19 and the inner peripheral groove 18 faces away from the wet side of the rod, i.e., toward the flat surface 17 of the next adjacent ring, and toward the flat surface of the partition wall 10 (or other confining wall of the housing at the dry side thereof). The segments are maintained in ring-forming assembly by the tension of endless light coil springs 20 seated in the outer peripheral grooves 16 and acting in radial compression on the segments, and the axial thickness of the rings is proportioned relatively to the axial length of the housing chamber so that there is very slight play of the rings axially along the rod as the rod reciprocates.

In operation, lubricating oil passes along the rod surface, from the supply such as the crankcase (not shown) at the lefthand end of the rod, and tends to enter the housing 7 through the rod-admitting opening 3 in the end wall 5. Most of this oil is stopped by the first ring 13 on the wet side and is thus prevented from passing inwardly beyond the opening 3. A very small amount of it, however, leaks not only axially inward between the rod 1 and the first ring 13, but also radially outward between the inner face of end wall 5 and the contacting flat surface 17 of the first ring 13. This leaking oil tends to fall by gravity into the sump 8. However, when passing down between the rings 13, or between a ring and an adjacent wall surface, such as the inner surfaces of the walls 5 and 10, the oil film becomes squeezed as the surfaces move together upon axial play of the rings. This squeezing of the oil tends to spread it, more or less equally in all directions, including of course radially inwardly, toward the rod. As this action continues, some of the oil migrates along the rod, toward the dry side at the right in the drawing where it would be free to pass through the opening in the wall 10 and out of the housing, or into the sealing rings 12. However, the slots 19 reduce considerably the area on the dry side of each ring which is capable of coming into engagement with the flat face of the adjacent ring or wall and thus substantially decrease the valving action consequent upon the rings moving into engagement with each other or with a wall surface. Moreover, such oil as does become valved by engagement of flat areas between the slots is largely squeezed into the slots, in which it is free to run down into the sump 8 either directly or by way of the inner peripheral groove 18. This action, it will be observed, takes place between each ring and the ring next adjacent to it on the dry side of the rod, and between the endmost ring, nearest the dry side, and the flat surface of the chamber end wall 10. Thus the rings of the first pair, nearest the wet side, retard the flow of much of the oil; the second and third rings, comprising the next pair, stop much of the oil that escapes the first pair, and so on, with the last ring cooperating with the wall 10 to effect the final trapping.

This effectiveness of forming the grooves and slots on the surfaces of the rings facing the dry side of the rod, with the surfaces facing the wet side formed flat, is supplemented by the manner in which the flat surface of the first ring on the wet side cooperates with the adjacent flat surface of the chamber wall 5. The contiguous, engaging surfaces of this ring and the wall being flat and unslotted and ungrooved, no passageway is provided for oil leaking through the opening 3 and along the rod to pass into the housing, such as would be provided by any grooving or slotting of the surface of the first ring which faces the wall 5. As has been seen, such oil as does pass this first ring becomes progressively trapped to greater and greater extent as it tends to move along the shaft, between the next adjacent rings, so that more and more of the oil is caught in the slots 19 and dropped into the sump 8.

In summary, my invention may be briefly described as relating to metal packings for use in compressors, pumps and other machines having a reciprocating piston rod extending from the "wet" side of the machine to the "dry" side thereof through a packing chamber having a flush surface on the end wall which separates that chamber from the dry side, and as residing in the combination with that chamber, of a plurality of rod encircling packing rings located within the chamber, said rings including, adjacent said end wall, a spring encompassed packing ring of the sectional type having a flat flush face on one side corresponding to the wet side of the machine and a flat radially grooved face on its opposite side in engagement with said flush surface of said end wall.

I claim:

1. A packing structure for use in compressors, pumps and other machines having "wet" and "dry" sides and a reciprocating piston rod extending from the wet side to the dry side, comprising: means forming a packing chamber having an end wall which separates that chamber from the dry side of the machine, said end wall presenting, within said chamber, a flush surface through which said piston rod extends; and a plurality of rod encircling packing rings located within said chamber, said rings including, adjacent said end wall, a spring encompassed packing ring of the sectional type having a flat flush face on one side corresponding to the wet side of the machine and, on its opposite side, a flat radially grooved face in engagement with said flush surface of said end wall and operative, in such engagement, to establish communication, through its radial grooves, between the inner periphery of the ring and the outer periphery thereof for conducting to said outer periphery liquid which is squeezed from between said rings and said flush surface.

2. A liquid wiper packing for a machine having wet and dry sides and a piston rod mounted for reciprocating axial movement between said wet side, which provides a liquid supply, and said dry side, which is intended to be kept free from said liquid, comprising:
 (A) wall means defining, between said wet and dry sides, a packing chamber having relatively wet and dry end walls through which the rod extends,
  (1) said wet end wall having one flat surface facing in the general direction of said dry side, and
  (2) said dry end wall having another flat surface facing in the general direction of said wet side; and
 (B) a packing chamber ring encircling said rod adjacent said other flat surface,
  (1) said ring having an inner periphery substantially engaging the rod, an outer periphery, and, between said peripheries, a pair of radially-extended side faces,
   (a) one facing in the direction of said wet end wall and
   (b) the other facing in the direction of said dry end wall and being adjacent thereto and in engagement with its aforesaid other flat surface, said other side face having a plurality of spaced radially-extending lands separated by radially-extending slots establishing communication between said inner and outer peripheries of the ring for conducting, to said outer periphery, liquid which is squeezed from between said lands and said other flat surface of said dry end wall.

3. The packing of claim 2 including:
 (A) a close succession of said rings in said packing chamber,
  (1) said succession beginning with a first ring and ending with said first-mentioned packing chamber ring as its last ring,
   (a) each ring of said succession, except the last, having the lands of its slotted side face in substantially flat face abutting relationship with said one face of the next adjacent ring.

4. The packing of claim 3 wherein:
 (A) said first ring of said succession has its aforesaid one side face in substantially flat face abutting relationship with said one flat surface of said wet end wall.

References Cited in the file of this patent

UNITED STATES PATENTS

| | | |
|---|---|---|
| 1,076,457 | Schultheiss | Oct. 21, 1913 |
| 1,837,115 | Cook | Dec. 15, 1931 |
| 1,999,094 | Godron | Apr. 23, 1935 |
| 2,132,010 | Barry | Oct. 4, 1938 |

FOREIGN PATENTS

| | | |
|---|---|---|
| 346,943 | Great Britain | Apr. 23, 1931 |
| 372,490 | Germany | Mar. 28, 1923 |